US010041721B2

(12) United States Patent
Qu et al.

(10) Patent No.: US 10,041,721 B2
(45) Date of Patent: Aug. 7, 2018

(54) HEAT PUMP COMPRISING PRIMARY DEFROST OPERATION AND SECONDARY DEFROST OPERATION AND METHOD OF OPERATING HEAT PUMP

(71) Applicant: Lennox Industries Inc., Richardson, TX (US)

(72) Inventors: Yi Qu, Coppell, TX (US); Bruce Perkins, Carrollton, TX (US); Chris Mchugh, Plano, TX (US); Mark Olsen, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 572 days.

(21) Appl. No.: 13/690,645

(22) Filed: Nov. 30, 2012

(65) Prior Publication Data

US 2014/0150479 A1 Jun. 5, 2014

(51) Int. Cl.
| | | |
|---|---|---|
| *F25B 49/00* | (2006.01) | |
| *F25D 21/00* | (2006.01) | |
| *F25B 47/02* | (2006.01) | |
| *F25B 13/00* | (2006.01) | |

(52) U.S. Cl.
CPC .......... *F25D 21/008* (2013.01); *F25B 47/025* (2013.01); *F25B 13/00* (2013.01); *F25B 2600/01* (2013.01); *F25B 2600/112* (2013.01); *F25B 2700/2117* (2013.01); *Y02B 30/743* (2013.01)

(58) Field of Classification Search
CPC .... F25B 47/025; F25B 13/00; F25B 2600/01; F25B 2600/112; F25B 2700/2117; F25D 21/008; Y02B 30/743
See application file for complete search history.

(56) References Cited

U.S. PATENT DOCUMENTS

| | | | | |
|---|---|---|---|---|
| 4,263,962 A | * | 4/1981 | Noland | 165/233 |
| 4,689,965 A | * | 9/1987 | Janke | F25D 21/006 |
| | | | | 62/155 |
| 4,903,500 A | * | 2/1990 | Hanson | B60H 1/321 |
| | | | | 62/155 |
| 5,319,943 A | * | 6/1994 | Bahel | F24F 1/0003 |
| | | | | 62/156 |
| 5,507,154 A | * | 4/1996 | Grant | 62/156 |
| 2003/0140639 A1 | * | 7/2003 | Gray | F25D 21/002 |
| | | | | 62/157 |
| 2004/0020228 A1 | | 2/2004 | Waldschmidt et al. | |

(Continued)

FOREIGN PATENT DOCUMENTS

WO 2009132971 A1 11/2009

OTHER PUBLICATIONS

PCT International Search Report for related PCT/US2013/072072, dated Feb. 20, 2014, 5 pages.

(Continued)

*Primary Examiner* — Ljiljana Ciric
*Assistant Examiner* — Alexis Cox
(74) *Attorney, Agent, or Firm* — Baker Botts L.L.P.

(57) ABSTRACT

One embodiment of the present disclosure comprises a method of managing defrost operations in HVAC systems. In one embodiment a primary defrost operation comprises allowing a cooling cycle of the heat pump and a secondary defrost operation comprises allowing fans of the heat pump to operate at a low speed.

19 Claims, 2 Drawing Sheets

(56) References Cited

U.S. PATENT DOCUMENTS

| | | | |
|---|---|---|---|
| 2004/0244389 A1* | 12/2004 | Denvir | F25D 21/002 62/156 |
| 2005/0262857 A1* | 12/2005 | Hrejsa et al. | 62/160 |
| 2006/0218946 A1* | 10/2006 | Davern | F25D 21/008 62/155 |
| 2006/0230768 A1* | 10/2006 | Huber | F25D 21/008 62/126 |
| 2007/0209789 A1 | 9/2007 | Oomura et al. | |
| 2008/0190131 A1* | 8/2008 | Giallombardo et al. | 62/324.5 |
| 2009/0293514 A1* | 12/2009 | Junge | F25D 11/022 62/115 |
| 2010/0211224 A1* | 8/2010 | Keeling | F24D 19/1066 700/277 |
| 2010/0229575 A1* | 9/2010 | Shaw | 62/81 |
| 2011/0036105 A1 | 2/2011 | Feng et al. | |
| 2011/0100041 A1* | 5/2011 | Crawford et al. | 62/156 |
| 2012/0047921 A1* | 3/2012 | Besore | F25D 21/06 62/80 |
| 2012/0060530 A1* | 3/2012 | Shimoda et al. | 62/132 |
| 2013/0312436 A1* | 11/2013 | Chen et al. | 62/81 |

OTHER PUBLICATIONS

PCT Written Opinion of the International Search Authority for related PCT/US2013/072072, dated Feb. 20, 2014, 5 pages.
Abstract WO2009/132971 A1, obtained from Espacenet on Apr. 22, 2014, 2 pages.

\* cited by examiner

HEAT PUMP COMPRISING PRIMARY DEFROST OPERATION AND SECONDARY DEFROST OPERATION AND METHOD OF OPERATING HEAT PUMP

TECHNICAL FIELD

The present disclosure relates to defrosting heat pumps.

BACKGROUND

Heat pumps may be utilized in residential air conditioning, commercial air conditioning, and/or refrigeration. During operation, a heat exchanger of the heat pump may be exposed to cold conditions in which frost may accumulate on surfaces of the heat pump.

SUMMARY

In one embodiment, defrosting a heat pump includes performing a primary defrost operation of a heat pump and determining whether to perform a secondary defrost operation of a heat pump. In one embodiment, the secondary defrost operation of the heat pump includes causing fan(s) of the heat pump to operate at a low speed, where the fan(s) are able to operate at the low speed and at least one higher speed. The secondary defrost operation is performed if the determination is made to allow the secondary defrost operation of the heat pump and an amount of frost accumulation disposed proximate part(s) of the heat pump will be at least partially reduced.

Implementations may include one or more of the following features. At least a portion of the primary defrost operation may be restricted during the secondary defrost operation. The primary defrost operation may include allowing a cooling cycle of the heat pump, and restricting operation of at least one of the fans of the heat pump. The determination of whether to allow the secondary defrost operation may be based at least partially on a setting of the heat pump and/or an identification of an ice event. The identification of an ice event may be at least partially based on weather proximate the heat pump, measurements from sensor(s), and/or property(ies) of the fan(s).

In some implementations, a change in temperature of a portion of a heat exchanger of the heat pump is determined, and an ice event is identified at least partially based on the determined change in temperature. In some embodiments, the determination of whether to perform the secondary defrost operation is based at least partially on identifying an ice event. In some implementations, a first temperature proximate a portion of a heat exchanger of the heat pump is determined during the secondary defrost operation, and a determination is made whether the first temperature exceeds a predetermined initiating temperature. The secondary defrost operation is allowed when the first temperature exceeds a predetermined initiating temperature.

In some implementations, a first temperature proximate a portion of a heat exchanger of the heat pump may be determined during the secondary defrost operation, and a determination may be made whether the first temperature exceeds a predetermined ending temperature. An operation of the secondary defrost operation may be restricted if a determination is made that the first temperature exceeds the predetermined ending temperature.

In some implementations, a determination may be made whether to allow additional secondary defrost operation(s), and at least a portion of the heat pump may be rebalanced, if a determination is made to allow the additional secondary defrost operation(s). Rebalancing the heat pump may include de-energizing a reversing valve for a first period of time. A predetermined ending temperature may be adjusted and at least one additional secondary defrost operation may be allowed after rebalancing at least a portion of the heat pump. A second temperature proximate a portion of a heat exchanger of the heat pump may be determined during at least one of the secondary defrost operations, and the second temperature may be compared to the adjusted predetermined ending temperature. An operation of the secondary defrost operation may be restricted if the second temperature exceeds the adjusted predetermined ending temperature. In some implementations, an operation time may be determined and include an operation time of the primary defrost operation and/or an operation time of the secondary defrost operation. The determined operation time may be compared to a predetermined maximum operation time, and operation of the secondary defrost may be restricted if the determined operation time exceeds the predetermined maximum operation time.

In various implementations, a primary defrost operation of a heat pump may be allowed and the primary defrost operation may include restricting operation of at least one fan of the heat pump. A determination may be made whether to allow a secondary defrost operation of a heat pump. The secondary operation of the heat pump may include allowing at least one of the fans to operate at a low speed, where the fan(s) may operate at the low speed and at least one higher speed. The secondary defrost operation may be allowed if the determination is made to allow the secondary operation of the heat pump. The primary defrost operation and/or the secondary defrost operation may at least partially reduce an amount of frost accumulation disposed proximate part(s) of the heat pump.

Implementations may include one or more of the following features. In some implementations, a change in at least one property of the heat pump may be determined; and a determination may be made whether an ice event has occurred based at least partially on the determined change in at least one of the properties of the heat pump. The determination of whether to allow the secondary defrost operation may be based at least partially on the determination of whether an ice event has occurred.

In some implementations, a first temperature proximate a portion of a heat exchanger of the heat pump may be determined during the secondary defrost operation, and a determination may be made whether the first temperature exceeds a predetermined initiating temperature. The secondary defrost operation may be allowed when the first temperature exceeds a predetermined initiating temperature. In some implementations, a first temperature proximate a portion of a heat exchanger of the heat pump may be determined during the secondary defrost operation, and a determination may be made whether the first temperature exceeds a predetermined ending temperature. Operation of the secondary defrost operation may be restricted if the determination is made that the first temperature exceeds the predetermined ending temperature.

In some implementations, a determination may be made whether to allow additional secondary defrost operation(s). At least a portion of the heat pump may be rebalanced, if a determination is made to allow the additional secondary defrost operation(s). Rebalancing the heat pump may include de-energizing a reversing valve for a first period of time. A predetermined ending temperature may be adjusted and at least one additional secondary defrost operation may be allowed after rebalancing at least a portion of the heat pump.

A second temperature proximate a portion of a heat exchanger of the heat pump may be determined during at least one of the secondary defrost operations, and the second temperature may be compared to the adjusted predetermined ending temperature. The secondary defrost operation may be allowed if the second temperature exceeds the adjusted predetermined ending temperature.

In some implementations, an operation time may be determined that includes an operation time of the primary defrost operation and/or an operation time of the secondary defrost operation. The determined operation time may be compared to a predetermined maximum operation time and operation of the secondary defrost may be restricted if the determined operation time exceeds the predetermined maximum operation time. In some implementations, a determination may be made whether an ice event has occurred, and a determination may be made whether to allow a secondary defrost operation based at least partially on the determination whether an ice event has occurred. In some implementations, a determination may be made whether an ice event will occur. Determining whether to allow a secondary defrost operation may be based at least partially on the determination whether an ice event will occur.

In various implementations, a heat pump may include heat exchanger(s), fan(s), a primary defrost operation module, and a secondary defrost operation module. The fan(s) may include a low speed and at least one higher speed. The primary defrost operation module may restrict operation of at least one of the fans; and allow a cool cycle of the heat pump. The primary defrost operation module may at least partially reduce an accumulation of frost proximate at least a portion of the heat pump. The secondary defrost operation module may allow operation of at least one of the fans during the cool cycle of the heat pump. The secondary defrost operation module may at least partially reduce an accumulation of frost proximate at least a part of the heat pump.

Implementations may include one or more of the following features. The heat pump may include a memory that stores a predetermined initiating temperature, a predetermined ending temperature, and/or predetermined maximum operation time. The secondary defrost operation module may determine a first temperature proximate a portion of at least one of the heat exchangers during the secondary defrost operation, and determine whether the first temperature exceeds a predetermined initiating temperature. The secondary defrost operation module may allow the secondary defrost module operation when the first temperature exceeds the predetermined initiating temperature. The secondary defrost operation module may determine a first temperature proximate a portion of a heat exchanger of the heat pump and/or an operation time during the secondary defrost operation. The operation time may include an operation time of the primary defrost operation and/or an operation time of the secondary defrost operation. The secondary defrost operation may restricting operation of the secondary defrost module, if the first temperature exceeds the predetermined ending temperature and/or the determined operation time exceeds the predetermined maximum operation time.

The details of one or more implementations are set forth in the accompanying drawings and the description below.

Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

Heat pumps may be utilized in a variety of applications, such as air conditioning and refrigeration systems. During operation, some portions of the heat pump, such as fan(s), housing(s), and heat exchanger(s) may be subject to conditions that cause an ice event (e.g., ice and/or frost accumulation). Frost/ice accumulation may cause noise during operation and/or inhibit operation of at least a portion of the heat pump (e.g., ice accumulation may restrict fan blade movement).

Figure 1:
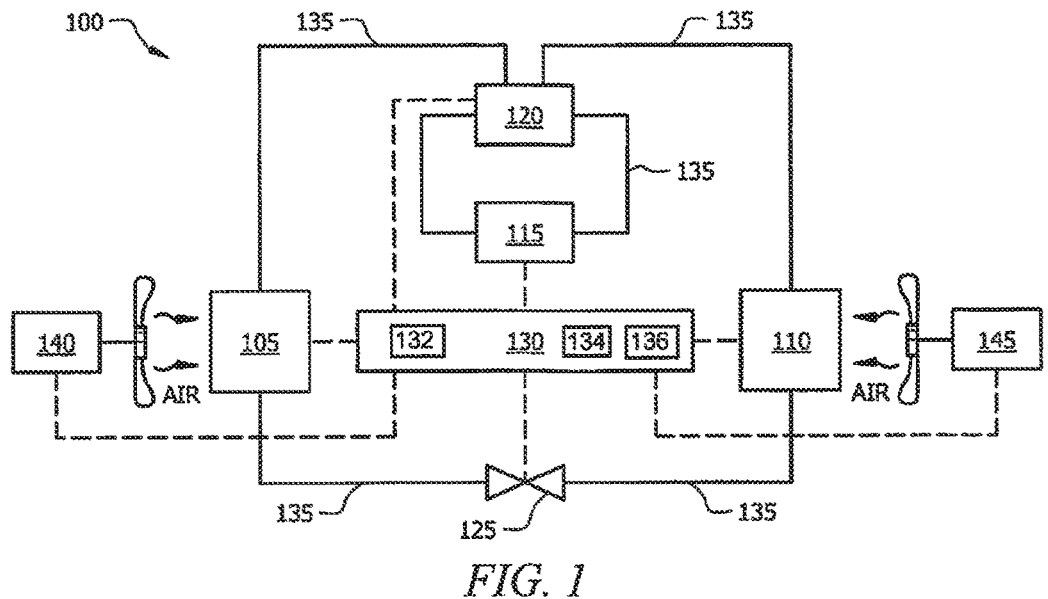
FIG. 1 illustrates an implementation of an example heat pump.

FIG. 1 illustrates an implementation of an example heat pump 100. As illustrated, the heat pump 100 includes heat exchangers 105, 110, compressor 115, reversing valve 120 (e.g., a valve capable of changing the direction of flow), and/or an expansion valve 125.

A controller 130 (e.g., a computer) may be coupled (e.g., communicably, such as by wires or linked by WiFi) to component(s) of the heat pump 100 and control various operations of the component(s) and/or system. For example, the controller 130 may include management modules, such as primary 132 and secondary 134 defrost modules to perform various operations of the heat pump 100. The management modules may control operations of the heat pump, such as receiving requests for operation, determining whether to respond to requests for operation, responding to requests for operation, and/or operating various components (e.g., compressors, reversing valves, and/or expansion valves). The primary defrost module and/or secondary defrost module may perform various operations to reduce the accumulation of frost on portions of the heat pump. For example, the primary defrost module and/or the secondary defrost module may perform one or more operations depicted by the flowcharts in FIGS. 2 and/or 3.

Lines 135 (e.g., tubing) may couple various components and allow refrigerant to flow in and/or out of various components of the heat pump 100. Fans 140, 145 may cause air to flow through heat exchangers 105, 110 disposed proximate the fans.

In some implementations, a portion of the heat pump 100 may be disposed outside a building (e.g., an "outdoor portion" on the ground proximate a building and/or on a roof of the building) and a portion of the heat pump may be disposed inside the building (e.g., an "indoor portion"). For example, the outdoor portion may include heat exchanger 105 and fan 140 and the indoor portion may include heat exchanger 110 and fan 145. The outdoor and/or indoor portion may be at least partially disposed in housing(s).

A heat pump 100 may allow operations with heating and cooling cycles. During a cooling cycle, cool air may be provided by blowing air (e.g., from a fan 145) at least partially through a first heat exchanger 110 (e.g., indoor portion), which acts as an evaporator to evaporate liquid refrigerant. A temperature of the air may be reduced and the cool air may be provided to a location (e.g., via ducting). The gaseous refrigerant may exit the first heat exchanger 110, be compressed by a compressor 115, and delivered to a second heat exchanger 105 (e.g., outdoor portion), which acts as a condenser. The second heat exchanger 105 may condense the gaseous refrigerant, for example, by blowing air (e.g, from a fan 140) at least partially through the second heat exchanger 105 to remove heat from the gaseous refrigerant.

To operate the heat pump 100 in a heat cycle, the heat pump 100 may include a reversing valve 120 to change the direction of refrigerant flow allow such that the refrigerant flows in the opposite direction as the refrigerant flow in the cooling cycle. For example, hot air may be provided by a fan 145 blowing air across the first heat exchanger 110 (e.g., indoor portion), which acts as a condenser (e.g., the air may remove heat from the refrigerant and allow the refrigerant to condense). The hot air may be provided (e.g., via ducting) to a location by the heating system. The second heat exchanger 105 (e.g., outdoor portion) may act as an evaporator and the temperature of the air, provided by fan 140, may be cooler leaving the second heat exchanger 105 than when entering the second heat exchanger 105.

During use, when a heat pump 100 is exposed to cold and moist air, frost (e.g., frost and/or ice) may accumulate on surfaces and/or other portions of component(s) of the heat pump 100. For example, when the second heat exchanger 105 and/or fan 140 are subject to moist and/or cold air, frost may accumulate on surfaces of the fan housing, fan blade, fan orifice, heat exchanger housing, and/or heat exchanger coil (e.g., coil tubing and/or fins). The frost accumulation may cause noise during operation and/or inhibit operation of at least a portion of the heat pump (e.g., the fan blade may be inhibited from rotating due to ice accumulation between the fan blade and the fan orifice). Noisy operation of a heat pump may decrease user satisfaction of a heat pump.

Figure 2:
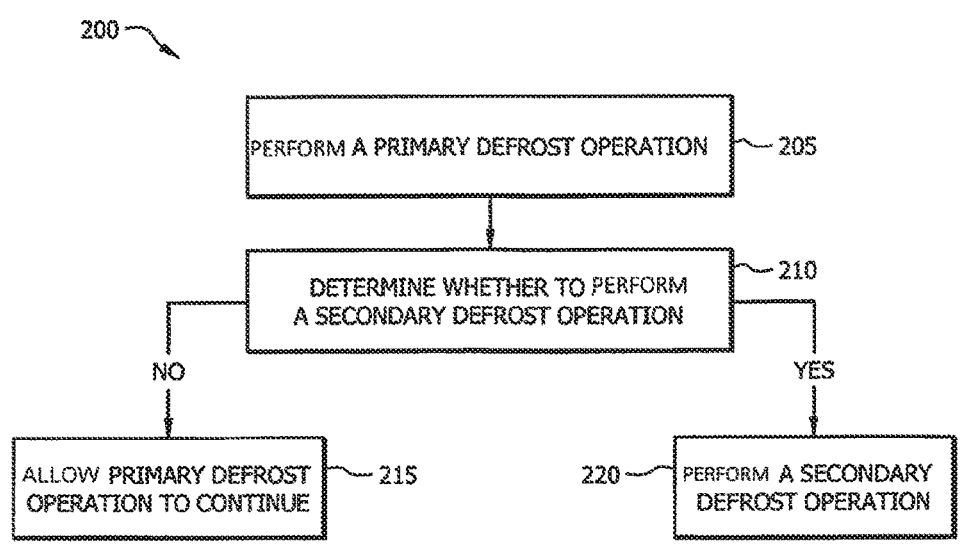
FIG. 2 illustrates an implementation of an example process for defrosting a heat pump.

FIG. 2 illustrates an implementation of an example process 200 for defrost operations for a heat pump. During ice events, the heat pump or portions thereof may experience frost accumulation during a heat cycle operation. Frost may accumulate proximate the coils of a heat exchanger of the heat pump or portions thereof and/or in at least a portion of the housing of the heat pump. A primary defrost operation may be allowed (operation 205). The primary defrost operation may raise the temperature proximate the coils by energizing the reversing valve to reverse the flow of refrigerant and initiate a cooling cycle. The cooling cycle may allow hot refrigerant to enter the heat exchanger (e.g., the heat exchanger proximate frost accumulation). The hot refrigerant may elevate the temperature of the coil and may cause the frost to at least partially melt and/or disengage from the heat pump or portions thereof. Thus, the elevated temperatures may at least partially reduce the frost accumulation.

The primary defrost operation may inhibit operation of the fan proximate the heat exchanger with frost accumulation. In some implementations, the fan and/or housings may have frost accumulation. Restricting operation of the fan may allow the temperature of the coil to rise more quickly than if the fan was operating, since hot air is not being forced away from the heat exchanger by the fan.

A determination may be made whether to allow a secondary defrost operation (operation 210). If a determination is made not to allow a secondary defrost operation, then a primary defrost operation may be allowed to continue (operation 215). For example, the operation of the fan may be inhibited and the coil temperature of the heat exchanger may continue to rise during the cooling cycle utilized by the primary defrost operation.

If a determination is made to allow a secondary defrost operation, then a secondary defrost operation may be conducted (operation 220). The secondary defrost operation may allow operation of one or more fans proximate the heat exchanger with frost accumulation (e.g., the outdoor portion). The fan(s) may be variable, multi-speed, and/or two-speed fan(s) and may include a low setting and at least one higher setting. During the primary defrost operation, a cooling cycle is run and hot refrigerant flows to the heat exchanger. During the secondary defrost operation, operation of a fan may be allowed at low speed to elevate the temperature of the coil and/or other portions of the heat pump. The temperature of the air provided by the fan may be raised by heat transfer with the refrigerant. The hot air may then raise the temperature of areas proximate the hot air (e.g., fan blade, fan orifice, and/or housings). The elevated temperatures provided by the hot air may cause the frost accumulation, in areas proximate the hot air flow, to melt and/or sheet away. In some implementations, the operation of the fan blade (e.g., the mechanical rotation and/or vibration during operation) may facilitate the removal of frost from portions of the heat pump (e.g., by breaking the ice bridge between the fan blade and the fan orifice and/or by shaking ice loose from portions of the heat pump). Thus, the frost accumulation may be at least partially reduced by the secondary defrost operation.

The secondary defrost operation may raise the temperature of areas proximate the heat exchanger coil more quickly and/or more efficiently than the primary defrost operation. The secondary defrost operation may reduce the amount of time necessary for the primary and/or secondary defrost operation (e.g., when compared with running the primary defrost operation alone) and thus, user comfort may be increased (e.g., by reducing the disruption of the heating cycle due to operation of the defrost cycle and/or by decreasing noise). In some implementations, by reducing frost accumulation on a housing of the outdoor portion and/or fan, noise from operation of the heat pump may be reduced. At least a portion of the primary defrost operation may be allowed during the secondary defrost operation.

Process 200 may be implemented by various systems, such as heat pump 100. In addition, various operations may be added, deleted, and/or modified. For example, a heat pump may include a setting that allows a secondary defrost operation after a primary defrost operation is initiated. A secondary defrost operation may be allowed when monitored properties are compared to predetermined values for the properties and an ice event is identified from the comparison (e.g., temperatures within a predetermined range of ice temperatures). In some implementations, a user may make a selection that indicates to the controller that secondary defrost operations may be allowed in conjunction with primary defrost operations.

During operation of a heat pump, a heat pump may operate in a heat cycle and generate cool air flowing proximate to a heat exchanger coil (e.g., outdoor portion). The cool air may cause frost formation proximate the heat exchanger coil and/or other portions of the heat pump in cool and/or moist environments. The frost may accumulate on various surfaces and other portions of the heat pump and cause noise (e.g., from frost on the fan and/or in the fan orifice) and/or reduce and/or inhibit operations of components of the heat pump (e.g., interference with heat transfer due to frost accumulation in coils, reduced movement of the fan blade due to frost accumulation, and/or inhibited movement of the fan blade due to frost accumulation). Allowing primary and/or secondary defrost operations may allow frost accumulation to be reduced and may improve performance of the heat pump and/or may reduce noise.

Figure 3:
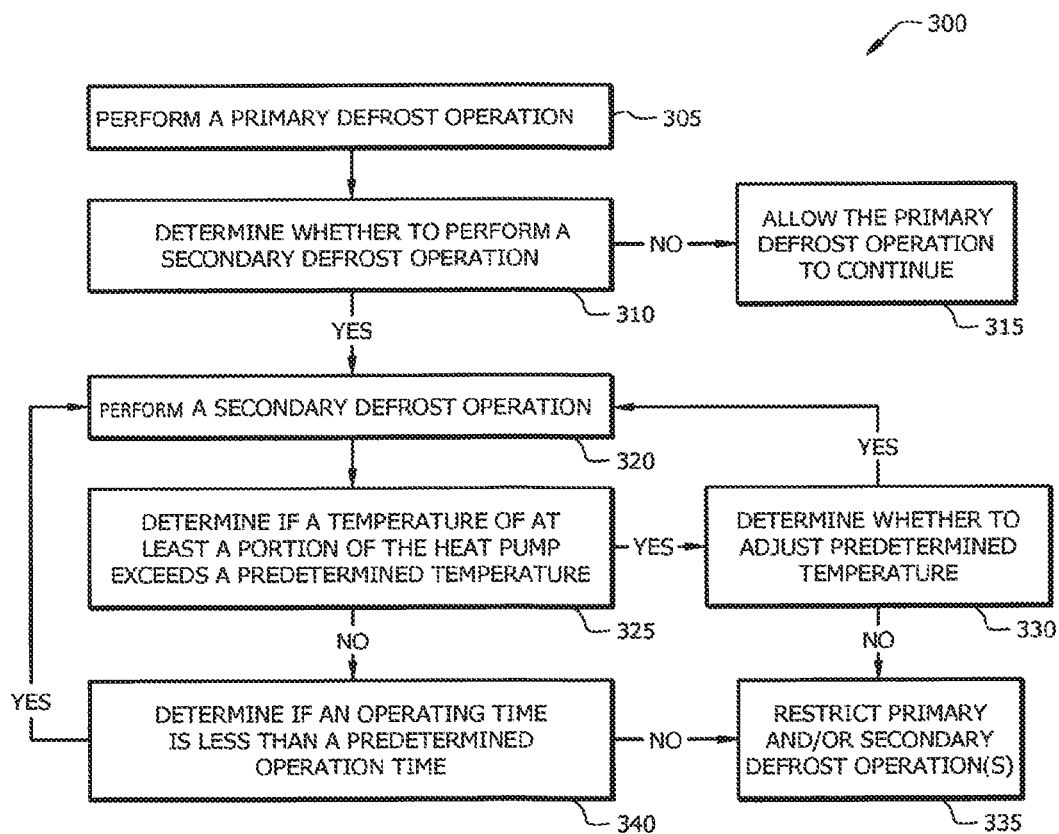
FIG. 3 illustrates an implementation of an example process for defrosting a heat pump.

FIG. 3 illustrates an implementation of an example process 300 for defrost of a heat pump. A primary defrost operation may be allowed (operation 305). For example, the primary defrost operation may initiate a defrost operation. The primary defrost operation may include energizing a reversing valve (e.g., to reverse the flow of refrigerant and allow a heat pump to switch operations, such as from a heating cycle to a cooling cycle) and/or restricting operation of one or more fans. For example, operation may be restricted in fan(s) in the outdoor portion of the heat pump and/or fan(s) proximate a heat exchanger that is experiencing an ice event. The operation of the primary defrost cycle may reduce the frost accumulation (e.g., by melting ice and/or disengaging ice) of at least a portion of the heat pump, such as proximate a coil of the heat exchanger. The frost accumulation may be decreased by elevating a temperature of the coil due to the reversed flow of the refrigerant.

A determination may be made whether to allow a secondary defrost operation (operation 310). For example, a heat pump may include a setting (e.g., factory setting, user selected setting, and/or field installed setting) that indicates that a secondary defrost operation should be allowed (e.g., when the primary defrost cycle is allowed). In some implementations, a determination may be made whether an ice event (e.g., frost accumulation and/or possible frost accumulation on the heat pump or portions thereof) has and/or will occur. Properties associated with the heat pump, such as weather, temperature, moisture level, pressure and/or other properties proximate L in the vicinity of) the heat pump may be monitored. If an ice event is identified (e.g., the monitored properties may be compared to predetermined ice event properties to determine whether an ice event has occurred and/or will occur) based at least partially on the monitored properties, a secondary defrost operation may be allowed.

If a determination is made not to allow a secondary defrost operation, a primary defrost operation may be allowed to continue (operation 315). For example, the secondary defrost operation may be restricted. The primary defrost operation may continue until a measured property of the heat pump exceeds a maximum operational property of the heat pump (e.g., a temperature exceeds a maximum coil temperature and/or a defrost operation time exceeds a maximum operation time). For example, properties, such as temperature proximate the coil and/or operation time may be monitored and compared to predetermined values for the monitored properties. In some implementations, the predetermined value, such as maximum coil temperature and/or maximum operation time may be selected to inhibit wear on components of the heat pump and/or to increase user satisfaction (e.g., since operation of the defrost cycle interrupts the flow of hot air from the heat pump to desired locations in a building). The predetermined values may be stored in a memory of the heat pump. The primary defrost operation may be restricted when the monitored properties exceed the predetermined values.

If a determination is made to allow a secondary defrost operation, the secondary defrost operation may be conducted (operation 320). The secondary defrost operation may include allowing a fan (e.g., a multi-speed and/or two-speed fan) proximate a portion of the heat pump with frost accumulation and/or a fan with frost accumulation to operate at a low speed. The secondary defrost operation may transfer heat from the coil (e.g., from hot refrigerant disposed in the coil) to air, provided by the fan and proximate the coil. The heated air may raise the temperature of areas proximate the heated air, such as fan blades, fan orifices, fan housings, heat exchanger housings, outdoor portions, outdoor portion housings, etc. The elevated temperature may reduce the accumulation of frost by decreasing the amount of frost on portions of the heat pump and/or by increasing a temperature of an area such that frost accumulation is inhibited (e.g., inhibited at least temporarily).

In some implementations, a secondary defrost operation may be allowed (e.g., initiated) after a predetermined period of time following commencement of the primary defrost operation. In some implementations, a temperature, such as coil temperature of a heat exchanger, may be measured to determine when to commence the secondary defrost operation. For example, when a measured temperature, such as coil temperature, is approximately equal to a predetermined initiating temperature, then a secondary defrost operation may be allowed and/or the fan may be allowed to operate at a low speed. In some implementations, at least a portion of the primary defrost operation (e.g., restriction of the fan operation) may be inhibited. In some implementations, a portion of the primary defrost operation may be allowed during the secondary defrost operation (e.g., allowing a cooling cycle of a heat pump).

A determination may be made (e.g., during the secondary defrost operation) whether a temperature of at least a portion of the heat pump has reached at least a predetermined maximum or ending temperature (operation 325). For example, a sensor may be disposed proximate at least a portion of the heat pump, such as the coil, and may be coupled to the controller. The sensor may measure temperature and/or other properties (e.g., moisture, pressure, etc.). The measured temperature may then be compared to a predetermined maximum or ending temperature value. A predetermined ending property value may be stored in a memory of the heat pump.

If a temperature does exceed the predetermined maximum temperature, then a determination may be made whether to adjust the predetermined maximum temperature (operation 330). For example, a temperature of the coil increases due to the increasing amount of hot refrigerant in the coil. Thus, refrigerant may be accumulating in the coil and the maximum capacity of the heat exchanger may be reached and/or approached. To achieve further heating, and thus further reduction in frost accumulation, when a predetermined maximum temperature is reached and/or exceeded, the reversing valve may be de-energized for a time period to allow refrigerant to flow through the valve in the opposite direction. In some implementations, a change in temperature of the coil may be monitored and when the change in temperature is within an ending range (e.g., the change in temperature over time decreases), the reversing valve may be de-energized for a time period. Thus, the amount of refrigerant in the heat exchanger may be decreased. The reversing valve may be re-energized and then hot refrigerant may be introduced to the heat exchanger to increase the temperature of the heat exchanger.

In some implementations, the predetermined maximum temperature may be adjusted (e.g., raised) so that the flow of refrigerant may be allowed to the heat exchanger and a secondary defrost operation may be allowed (operation 320). In some implementations, if the predetermined maximum temperature was not adjusted, the additional secondary defrost operation may be restricted due to the temperature of the coil, for example (e.g., since the coil may already be at the predetermined maximum or ending temperature, the secondary defrost operation may just cycle off approximately immediately).

If a determination is made not to adjust a predetermined temperature, the primary and/or secondary defrost operations may be restricted (operation 335). For example, if adjusting the predetermined maximum temperature may damage the heat pump or portions thereof, the predetermined maximum temperature may not be adjusted.

If the temperature of at least a portion of the heat pump does not exceed the predetermined temperature, then a determination may be made whether an operating time is less than a predetermined maximum operation time (operation 340). For example, the controller (e.g., modules of the controller) may monitor an operation time of the primary and/or secondary defrost operations. The controller may compare the monitored operation time to a predetermined maximum operation time(s) stored in a memory of the heat pump.

If the operating time is less than a predetermined maximum operation time, then the secondary defrost operation may be allowed to continue (operation 320). If the operating time is not less than the predetermined maximum operation time, then a primary and/or secondary defrost operation may be restricted (operation 335). For example, the defrost operation(s) may be allowed to operate for fixed periods of time to increase user satisfaction (e.g., since hot air is not provided to user selected locations during the defrost cycle, satisfaction during defrost cycle operations may be reduced).

Process 300 may be implemented by various systems, such as system 100. In addition, various operations may be added, deleted, and/or modified. In some implementations, process 300 may be performed in combination with other processes such as process 200.

In some implementations, a determination of whether to allow the secondary defrost cycle may be based on various factors. For example, properties of a heat pump may be monitored and an ice event may be identified. A determination of whether to allow the secondary defrost operation may be based at least partially on the identified ice event. For example, the weather in a region or an area (e.g., the area in which the heat pump is disposed, such as a city) may be monitored (e.g., a weather report may be retrieved and monitored by the controller). The weather may be analyzed to determine if an ice event will and/or has occurred (e.g., properties of an ice event may be stored in the heat pump and the stored property values may be compared to the weather). The determination whether to allow a secondary defrost operation may be based at least partially on the determination of whether an ice event will occur based on the monitored weather.

In some implementations, an ice sensor may be utilized to determine if an ice event has occurred. U.S. patent application Ser. No. 13/690,561 to Uselton, et al., entitled "ICE SENSOR FOR A HEAT PUMP" and filed on Nov. 30, 2012 describes some ice sensors, and is incorporated by reference as if fully described herein. The ice sensor may identify ice events and secondary defrost cycles may be allowed to reduce the frost accumulation.

In some implementations, properties of a fan may be monitored to determine frost events, which indicate ice events and/or frost accumulation on portions of the heat pump. U.S. patent application Ser. No. 13/690,463 to Qu, et al., entitled "Defrost Control Using Fan Data" and filed on Nov. 30, 2012 describes fan monitoring to determine frost accumulation, and is incorporated by reference as if fully described herein. The heat pump may monitor properties of the fan to identify ice events and allow secondary defrost operations based at least partially on the identification of the ice events.

In some implementations, a temperature of a portion of the heat exchanger (e.g., coils) may be measured and/or monitored. The change in the temperature may be utilized to determine whether to allow a secondary defrost operation. For example, a change in temperature over time, a change in the ratio (e.g., slope) of the temperature to time, a change in temperature, and/or a temperature value may be monitored and/or compared to predetermined values. A determination of whether to allow a secondary defrost operation may be based at least partially on this comparison.

In some implementations, a determination may be made to allow the secondary defrost operation when frost is not present on and/or near the coils. For example, the defrost software may be calibrated when frost is not present on and/or near the coils. The calibration may improve and/or maintain accurate performance of the various described systems and/or processes. The calibration may be allowed after a secondary defrost operation has been allowed.

In some implementations, the determination to allow a secondary defrost operation may be based at least partially on a predetermined maximum compressor run time. During operations, when a compressor run time is greater than or approximately equal to the predetermined maximum compressor run time, then the secondary defrost operation may be allowed. For example, when a measured temperature, such as coil temperature, is approximately equal to a predetermined initiating temperature, and when a compressor run time is greater than a predetermined compressor run time (e.g., 6 hours), a determination may be made to allow the secondary defrost operation.

Although FIG. 1 describes an implementation of a heat pump, other implementations may be utilized as appropriate. For example, the heat pump may be disposed inside a building. In some implementations, the heat pump may include a metering device, such as an expansion valve.

Although a specific controller has been described in FIG. 1, the controller may be any appropriate computer or other programmable logic device. The controller may include a processor that executes instructions and manipulates data to perform operations of the controller. Processor may include a programmable logic device, a microprocessor, or any other appropriate device for manipulating information in a logical manner and memory 136 may include any appropriate form(s) of volatile and/or nonvolatile memory, such as RAM and/or Flash memory.

The memory may include data, such as predetermined property values (e.g., temperature, moisture level, weather, and/or pressure); predetermined properties of events such as frost accumulation, ice events, and/or other events to facilitate identification of the predetermined events; periods of time that operations should run (e.g., maximum operational time); and/or any other data useful to the operation of the heat pump and/or defrost operations (e.g., primary and/or secondary defrost operations).

In addition, various software may be stored on the memory. For example, instructions (e.g., operating systems and/or other types of software), an operation module, primary defrost module, and/or secondary defrost module may be stored on the memory. The operation module may operate the heat pump during normal operations (e.g., operations in which the system operates based at least partially on user requests for operation and/or during non-ice events). For example, the operation module may receive requests for operation from a user and operate the heat pump to satisfy the user request. The primary defrost operation may restrict operation of fan(s), energize reversing valves, allow cool cycles of the heat pump, restrict operation(s) of a secondary defrost operation, and/or allow other operations to at least partially reduce frost accumulation. The secondary defrost operation may allow fan operations at low speed; monitor properties to indicate when to initiate and/or end primary and/or secondary defrost operations; restrict and/or allow various operation(s) of the primary defrost operation, retrieve data such as predetermined values for properties; compare properties to predetermined property values; determine whether to initiate and/or end defrost operations based on monitored properties; identify ice events; adjust predetermined values; and/or allow other operations to at least partially reduce frost accumulation of at least a portion of the heat pump.

In some implementations, modules may be combined, such as into a single module or multiple modules. Operation modules and defrost modules may be distinct modules. In an implementation, operation modules and/or defrost modules may include various modules and/or sub-modules.

A communication interface may allow the controller to communicate with components of the heat pump, other repositories, and/or other computer systems (e.g., for weather reports). The communication interface may transmit data from the controller and/or receive data from other components, other repositories, and/or other computer systems via network protocols (e.g., TCP/IP, Bluetooth, and/or Wi-Fi) and/or a bus (e.g., serial, parallel, USB, and/or FireWire). Operations of the heat pump stored in the memory may be updated and/or altered through the communication via network protocols (e.g., remotely through a firmware update and/or by a device directly coupled to the controller).

The controller may include a presentation interface to present data to a user, such as though a monitor and speakers. The presentation interface may facilitate receipt of requests for operation from users.

A client (e.g., control panel in field or building) may allow a user to access the controller and/or instructions stored on the controller. The client may be a computer system such as a personal computer, a laptop, a personal digital assistant, a smart phone, or any computer system appropriate for communicating with the controller. For example, a technician may utilize a client, such as a tablet computer, to access the controller. As another example, a user may utilize a client, such as a smart phone, to access the controller and request operations.

Although FIG. 1 provides one example of controller that may be used with the disclosure, controller can be implemented through computers such as servers, as well as a server pool. For example, controller may include a general-purpose personal computer (PC) a Macintosh, a workstation, a UNIX-based computer, a server computer, or any other suitable device. In some implementations, a controller may include a programmable logic device. For example, the controller may be mounted to a wall of a location in which air conditioning may be provided. According to one implementation, controller may include a web server. Controller may be adapted to execute any operating system including UNIX, Linux, Windows, or any other suitable operating system. Controller may include software and/or hardware in any combination suitable to provide access to data and/or translate data to an appropriate compatible format.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system, including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although users have been described as a human, a user may be a person, a group of people, a person or persons interacting with one or more computers, and/or a computer system.

Various described patents and patent applications have been incorporated by reference. The described patents and patent applications are incorporated by reference to the extent that no conflict exists between the various described systems and/or processes and the described patents and patent applications. Any portion(s) of such described patents and patent applications that is in conflict with the various described systems and/or processes are not incorporated by reference.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a primary defrost operation" includes a combination of two or more primary defrost operations and reference to "a secondary defrost operation" includes different types and/or combinations of defrost operations. Reference to "a compressor" may include a combination of two or more compressors. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for defrosting a heat pump, the method comprising:
   performing a primary defrost operation of the heat pump, the primary defrost operation comprising a cooling cycle of the heat pump;
   determining whether to perform a secondary defrost operation of the heat pump, wherein the secondary defrost operation of the heat pump comprises operating one or more fans of the heat pump at a low speed, wherein at least one of the fans is operable at the low speed and at least one higher speed, wherein the determining comprises comparing a compressor run time to a predetermined compressor run time, wherein the secondary defrost operation is performed if the compressor run time is greater than the predetermined compressor run time; and
   performing the secondary defrost operation simultaneously with the primary defrost operation if the determination is made to perform the secondary defrost operation of the heat pump.

2. The method of claim 1 wherein the primary defrost operation comprises: restricting operation of at least one of the fans of the heat pump.

3. The method of claim 1 wherein the determination of whether to perform the secondary defrost operation is based at least partially on an identification of an ice event, wherein an identification of an ice event is at least partially based on a weather report received from another computer system by a controller of the heat pump.

4. The method of claim 1 further comprising:
   determining a change in temperature of a portion of a heat exchanger of the heat pump; and
   identifying whether an ice event has occurred at least partially based on the determined change in temperature;
   wherein the determination of whether to perform the secondary defrost operation is based at least partially on identifying the ice event.

5. The method of claim 1 further comprising:
   determining a first temperature proximate a portion of a heat exchanger of the heat pump during the secondary defrost operation;
   determining whether the first temperature exceeds a predetermined temperature; and
   restricting the secondary defrost operation when the first temperature exceeds the predetermined temperature.

6. The method of claim 1 wherein determining whether to perform a secondary defrost operation comprises:
   determining a first temperature proximate a portion of a heat exchanger of the heat pump during the secondary defrost operation;
   determining whether the first temperature exceeds a maximum temperature; and
   raising the maximum temperature.

7. The method of claim 6 further comprising:
   determining whether to perform one or more additional secondary defrost operations;
   rebalancing at least a portion of the heat pump if a determination is made to perform one or more of the additional secondary defrost operations, wherein rebalancing the heat pump comprises de-energizing a reversing valve for a first period of time;
   adjusting the maximum temperature;
   performing at least one additional secondary defrost operation after rebalancing at least a portion of the heat pump;
   determining a second temperature proximate a portion of a heat exchanger of the heat pump during at least one of the secondary defrost operations;
   comparing the second temperature to the adjusted maximum temperature; and
   restricting operation of the secondary defrost operation if the second temperature exceeds the maximum temperature.

8. The method of claim 1 further comprising:
   determining an operation time comprising at least one of:
      an operation time of the primary defrost operation, or
      an operation time of the secondary defrost operation;
   comparing the determined operation time to a predetermined maximum operation time; and
   restricting operation of the secondary defrost if the determined operation time exceeds the predetermined maximum operation time.

9. A controller for an air conditioning system, the controller comprising:
   a plurality of connections to a plurality of components of the air conditioning system; and
   wherein the controller is operable to:
      begin a primary defrost operation of a heat pump of the air conditioning system, wherein the primary defrost operation comprises a cooling cycle of the heat pump;
      determine whether to begin a secondary defrost operation of the heat pump, wherein the secondary defrost operation of the heat pump comprises operating at least one of the fans at a low speed, wherein at least one of the fans is operable at the low speed and at least one higher speed, wherein determining whether to begin a secondary defrost operation of the heat pump comprises comparing a change in a ratio of temperature to time to one or more predetermined values and performing the secondary defrost operation based on the comparison; and
      perform the secondary defrost operation simultaneously with the primary defrost operation if the determination is made to perform the secondary operation of the heat pump.

10. The controller of claim 9, wherein the controller is further operable to:
   determine whether an ice event has occurred based at least partially on at least one of the determined change in temperature and a change determined for one or more other properties associated with the heat pump;
   wherein the determination of whether to perform the secondary defrost operation is based at least partially on the determination of whether an ice event has occurred.

11. The controller of claim 9 wherein the controller is further operable to:
 determine a first temperature in the vicinity of a heat exchanger of the heat pump during the secondary defrost operation;
 determine whether the first temperature exceeds a predetermined initiating temperature; and
 perform the secondary defrost operation when the first temperature exceeds a predetermined initiating temperature.

12. The controller of claim 9 wherein the controller is further operable to:
 determine a first temperature in the vicinity of a heat exchanger of the heat pump during the secondary defrost operation;
 determine whether the first temperature exceeds a predetermined ending temperature;
 restrict operation of the secondary defrost operation if the determination is made that the first temperature exceeds the predetermined ending temperature; and
 initiating operation of the secondary defrost operation if the determination is made that the first temperature does not exceed the predetermined ending temperature.

13. The controller of claim 9 wherein the controller is further operable to:
 determine whether to perform one or more additional secondary defrost operations;
 rebalance at least a portion of the heat pump if a determination is made to perform one or more of the additional secondary defrost operations, wherein rebalancing the heat pump comprises de-energizing a reversing valve for a first period of time;
 adjust a maximum temperature;
 perform at least one additional secondary defrost operation after rebalancing at least a portion of the heat pump;
 determine a second temperature in the vicinity of a heat exchanger of the heat pump during at least one of the secondary defrost operations;
 compare the second temperature to the adjusted maximum temperature; and
 restrict operation of the secondary defrost operation if the second temperature exceeds the adjusted maximum temperature.

14. The controller of claim 9 wherein the controller is further operable to:
 determine an operation time comprising at least one of an operation time of the primary defrost operation or an operation time of the secondary defrost operation;
 compare the determined operation time to a predetermined maximum operation time; and
 restrict operation of the secondary defrost if the determined operation time exceeds the predetermined maximum operation time.

15. The controller of claim 9 further comprising:
 a weather report receiver, the weather report receiver operable to determine whether an ice event has occurred based on a weather report received from another computer system;
 wherein determining whether to perform a secondary defrost operation is based at least partially on the determination of whether an ice event has occurred.

16. The controller of claim 9 wherein the controller is further operable to:
 determine whether an ice event will occur;
 wherein determining whether to perform a secondary defrost operation is based at least partially on the determination of whether an ice event will occur.

17. A heat pump comprising:
 one or more heat exchangers;
 one or more fans, wherein at least one of the fans is operable at a low speed and at least one higher speed;
 a primary defrost operation module adapted to:
  restrict operation of at least one of the fans;
  and perform a cooling cycle of the heat pump; and
 a secondary defrost operation module adapted to:
  compare a compressor run time to a predetermined compressor run time;
  operate at least one of the fans during the cooling cycle of the heat pump if the compressor run time is greater than the predetermined compressor run time.

18. The heat pump of claim 17 further comprising a memory storing a predetermined initiating temperature, and wherein the secondary defrost operation module is further adapted to:
 determine a first temperature in the vicinity of at least one of the heat exchangers during the secondary defrost operation;
 determine whether the first temperature exceeds a predetermined initiating temperature; and
 perform secondary defrost module operation when the first temperature exceeds the predetermined initiating temperature.

19. The heat pump of claim 17 further comprising a memory storing at least one of a predetermined ending temperature or a predetermined maximum operation time, and wherein the secondary defrost operation module is further adapted to:
 determine at least one of a first temperature in the vicinity of a heat exchanger of the heat pump or an operation time during the secondary defrost operation, wherein the operation time comprises at least one of an operation time of the primary defrost operation or an operation time of the secondary defrost operation;
 restrict operation of the secondary defrost module, if at least one of:
  the first temperature exceeds the predetermined ending temperature; or the determined operation time exceeds the predetermined maximum operation time; and
 initiate operation of the secondary defrost module if the first temperature does not exceed the predetermined ending temperature.

* * * * *